US008217334B1

(12) United States Patent  
Lang et al.

(10) Patent No.: US 8,217,334 B1
(45) Date of Patent: Jul. 10, 2012

(54) OPTICAL NAVIGATION SENSOR INCLUDING A SPATIAL FREQUENCY FILTER

(75) Inventors: Robert J. Lang, Alamo, CA (US); Jahja I. Trisnadi, Cupertino, CA (US); Steven Sanders, Los Altos, CA (US); Ke-Cai Zeng, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 364 days.

(21) Appl. No.: 12/317,521

(22) Filed: Dec. 24, 2008

(51) Int. Cl.
*G06M 7/00* (2006.01)
*G06F 3/033* (2006.01)

(52) U.S. Cl. ......................... 250/221; 345/166
(58) Field of Classification Search .................. 250/221; 345/163–167
See application file for complete search history.

(56) References Cited

U.S. PATENT DOCUMENTS

| | | |
|---|---|---|
| 3,922,093 A | 11/1975 | Dandliker et al. |
| 4,546,347 A | 10/1985 | Kirsch |
| 4,799,055 A | 1/1989 | Nestler et al. |
| 5,288,993 A | 2/1994 | Bidiville et al. |
| 5,473,344 A | 12/1995 | Bacon et al. |
| 5,481,095 A * | 1/1996 | Mitsuda et al. ............ 235/454 |
| 5,578,813 A | 11/1996 | Allen et al. |
| 5,644,139 A | 7/1997 | Allen et al. |
| 5,703,356 A | 12/1997 | Bidiville et al. |
| 5,729,008 A | 3/1998 | Blalock et al. |
| 5,729,009 A | 3/1998 | Dandliker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,225,617 B1 | 5/2001 | Dandliker et al. |
| 6,233,368 B1 | 5/2001 | Badyal et al. |
| 6,256,016 B1 * | 7/2001 | Piot et al. ................ 345/166 |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |

(Continued)

*Primary Examiner* — Thanh X Luu (57) ABSTRACT

An optical navigation sensor (ONS) is provided having a spatial frequency filter to transmit radiation at selected spatial frequencies while attenuating other, undesired frequencies and harmonics. The ONS includes a radiation source to transmit radiation toward a portion of a surface that diffusely reflects radiation incident thereon. The spatial frequency filter is disposed to receive radiation scattered from the surface, and, in one embodiment, includes a number of non-circular openings to pass radiation of at least one pre-selected frequency while attenuating other frequencies and harmonics of the pre-selected frequency.

13 Claims, 4 Drawing Sheets

U.S. PATENT DOCUMENTS

| | | |
|---|---|---|
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,138,620 B2 | 11/2006 | Trisnadi et al. |
| 7,221,356 B2 | 5/2007 | Oliver et al. |
| 7,247,832 B2 | 7/2007 | Webb |
| 7,248,345 B2 | 7/2007 | Todoroff et al. |
| 7,250,893 B2 | 7/2007 | Todoroff et al. |
| 7,297,912 B1 | 11/2007 | Todoroff et al. |
| 7,298,460 B2 | 11/2007 | Xu et al. |
| 2006/0118743 A1 | 6/2006 | Lang |
| 2007/0057157 A1 | 3/2007 | Trisnadi et al. |
| 2007/0138377 A1 | 6/2007 | Zarem |
| 2007/0143383 A1 | 6/2007 | Xu et al. |
| 2007/0291272 A1* | 12/2007 | Itagaki .......................... 356/450 |

* cited by examiner

OPTICAL NAVIGATION SENSOR INCLUDING A SPATIAL FREQUENCY FILTER

TECHNICAL FIELD

The present disclosure relates generally to optical navigation sensors, and more particularly to an optical navigation sensor including a spatial frequency filter.

BACKGROUND

Optical navigation sensors (ONS) are commonly used in devices, such as an optical computer mouse, trackball or touch pad, for interfacing with personal computers and workstations. One technology used for optical navigation sensors relies on light from a coherent source reflected or scattered off of an optically rough surface to generate a complex interference pattern of light known as speckle. The speckle image is mapped to an array of photosensitive elements, such as photodiodes, through an imaging system including a finite, angular field-of-view or numerical aperture. Movement of this image is tracked as it moves back and forth across the array through signal processing and from that tracking the motion of the ONS relative to the surface is derived.

SUMMARY

An optical navigation sensor (ONS) is provided having a spatial frequency filter to improve tracking of motion of the ONS relative to surface. Generally, the ONS includes a radiation source to transmit radiation toward a portion of the surface that diffusely reflects radiation incident thereon. The spatial frequency filter is disposed to receive radiation scattered from the surface. In one embodiment, the spatial frequency filter includes a number of non-circular openings to pass radiation of at least one pre-selected frequency while attenuating other frequencies and harmonics of the pre-selected frequency.

BRIEF DESCRIPTION OF THE DRAWINGS

These and various other features of the optical navigation system and spatial frequency filter will be apparent upon reading of the following detailed description in conjunction with the accompanying drawings and the appended claims provided below, where:

DETAILED DESCRIPTION

The present disclosure is directed generally to optical navigation sensors (ONS) configured to determine a direction and magnitude of movement of the ONS relative to a surface over or on which it is placed by detecting changes in a pattern of light reflected or scattered from the surface. More particularly, the disclosure is directed to speckle-based ONSs including spatial frequency filters having a number of apertures or openings sized, shaped and located to pass light or radiation of at least one pre-selected frequency while attenuating other frequencies and harmonics of the pre-selected frequency.

ONS and in particular speckle-based ONS will now be described with reference to FIGS. 1 and 2. For purposes of clarity, many of the details of speckle-based ONS, which are widely known and not relevant to the present invention, have been omitted from the following description. Speckle-based Optical navigation systems are described, for example, in commonly assigned U.S. Pat. No. 7,138,620, entitled, "Two-Dimensional Motion Sensor," by Jahja Trisnadi et al., issued on Nov. 21, 2006.

Figure 1:
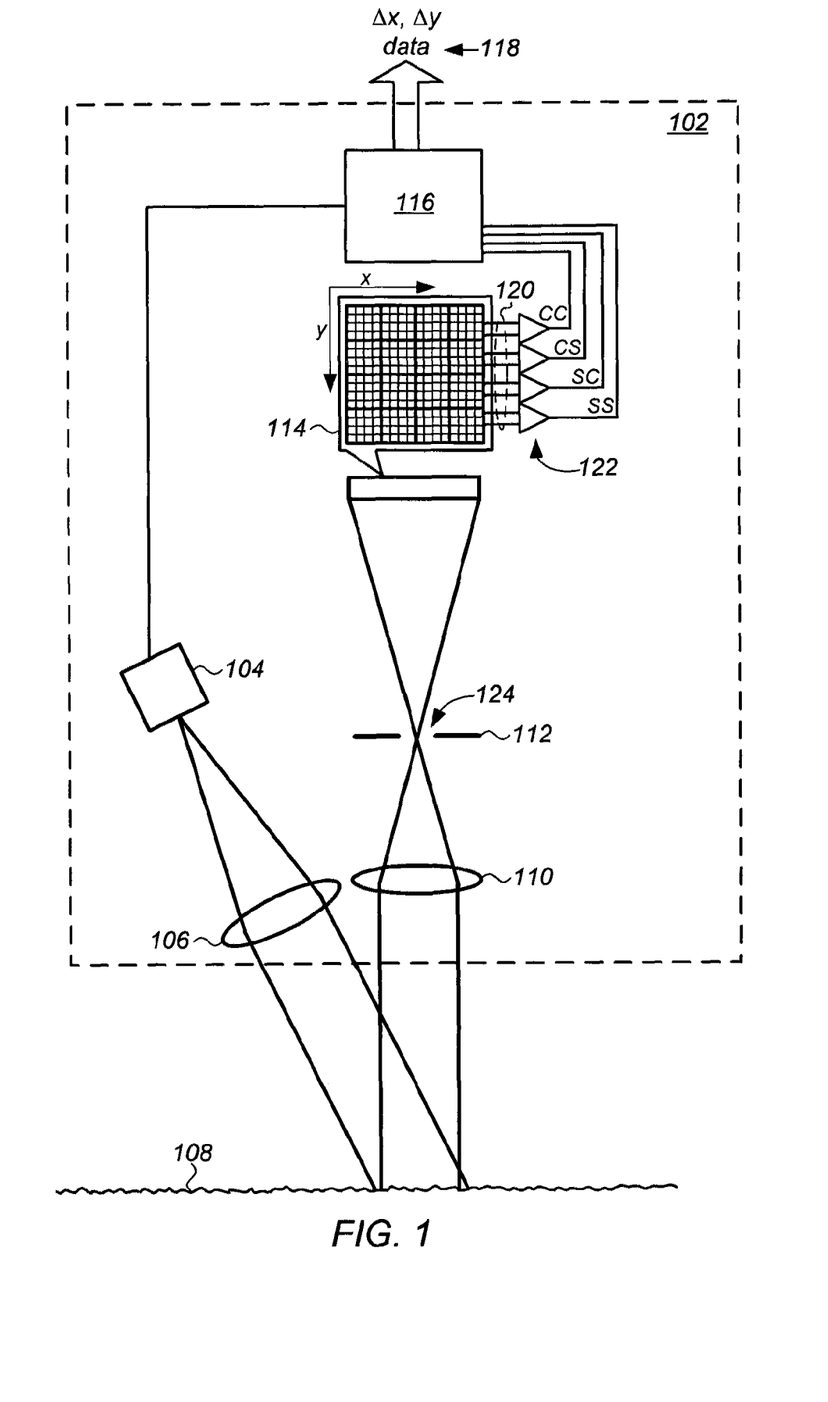
FIG. 1 is a schematic block diagram of a speckle-based optical navigation system (ONS) according to one embodiment.

Referring to FIG. 1, in one embodiment the ONS 102 generally includes a radiation or light source 104, illumination optics including an illumination lens 106 to illuminate a portion of a surface 108, imaging optics including an imaging lens 110 and a spatial frequency filter 112 at a Fourier transform plane of the imaging lens having an aperture or opening to transmit light scattered from the surface to a sensor-array 114 at an image plane of the imaging lens. The sensor-array 114 can include one or more one or two dimensional arrays of photosensitive elements, such as photodiodes (PDs), configured to sense displacement of patterns in the scattered light measurements along one or more axes. A signal processor 116 receives electrical current or voltage signals from the sensor-array 114, which are then processed to provide measurements or data (Δx, Δy data 118) on a magnitude and direction of displacement of the ONS 102 relative to the surface 108.

In the embodiment shown, the sensor-array 114 includes a two-dimensional (2D) array of interlaced groups of linear PDs, known as a differential comb array, configured to sense displacement along at least two orthogonal axes, x and y. PDs within an interlaced group are sized and spaced apart to have a period or pitch matched to features in the speckle pattern imaged onto the sensor-array. The interlaced groups of PDs are electrically connected (wired sum) to form eight signal lines 120 coming out from the sensor-array. Differential transimpedance amplifiers (TIAs 122) integrate current signals from the signal lines 120 to generate a set of four differential signals, labeled here as CC, CS, SC, and SS, which are the four signals that contain in-phase and quadrature information for movement in the x and y directions. Although a set of four TIA channels are shown in FIG. 1, the ONS 102 can include any number of sets of TIA channels depending on the number of dimensions, periodicity, and/or number of discrete arrays within the sensor-array 114. For example, in a sensor 114 having a single 1D array, the ONS 102 may have only two TIA channels.

In certain embodiments, the ONS 102 is a telecentric, speckle-based ONS. FIG. 2 illustrates a speckle pattern formed at the sensor-array 114 from an interference pattern of light scattered from an optically rough surface. By optically rough it is meant a surface that includes morphological irregularities of dimensions greater than the wavelength of the incident light (i.e. roughly>1 μm), which will tend to scatter light 202 into a complete hemisphere in approximately a Lambertian fashion. If a coherent light source, such as a laser is used, the spatially coherent, scattered light will create a complex interference pattern 204 upon detection by a square-law detector with finite aperture. This complex interference pattern 204 of light and dark areas is termed speckle. As shown in FIG. 2, the main contribution for the measured speckle pattern 204 comes from rays 206 between the surface normal 208 and angle θ 210, not from the extreme rays 212. Speckle is the random interference pattern generated by scattering of coherent light off of a rough surface and detected by an intensity photosensitive element, such as a photodiode, with a finite angular field-of-view or numerical aperture (NA). The exact nature and contrast of the speckle pattern depends on the surface roughness, the wavelength of light and its degree of spatial-coherence, and the light-gathering or imaging optics of the sensor. Although highly complex, the speckle pattern is distinctly characteristic of a section of the surface 108 that is imaged by the ONS 102 and, therefore can be employed to identify a location of the ONS on the surface.

Figure 2:
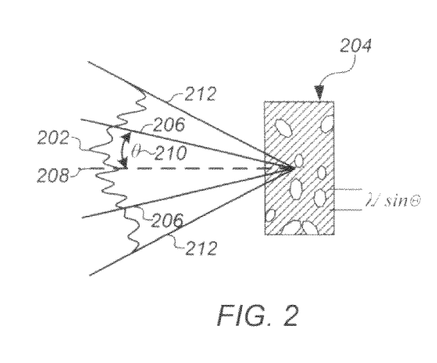
FIG. 2 illustrates a speckle in an interference pattern of light scattered from an optically rough surface.

Speckle is expected to come in all sizes up to the spatial frequency set by the effective aperture of the optics, conventionally defined in term of its numerical aperture NA=sin θ as shown FIG. 2. Following Goodman [J. W. Goodman, "Statistical Properties of Laser Speckle Patterns" in "Laser Speckle and Related Phenomena" edited by J. C. Dainty, Topics in Applied Physics volume 9, page 39-40, Springer-Verlag (1984).], the size statistical distribution is expressed in terms of the speckle intensity autocorrelation. The "average" speckle diameter is defined as:

$$a = \frac{\lambda}{NA} \quad (1.0)$$

where λ is the wavelength of the coherent light, and NA is the numerical aperture of the photosensitive element.

A speckle-based ONS can operate with illumination light that arrives at near-normal incidence angles. Sensors that employ imaging optics and incoherent light arriving at grazing incident angles to a rough surface also can be employed for transverse displacement sensing. But, since the grazing incidence angle of the illumination is used to create appropriately large bright-dark shadows of the surface terrain in the image, the system is inherently optically inefficient, as a significant fraction of the light is scattered off in a specular manner away from the sensor and thus contributes nothing to the image formed. In contrast, a speckle-based sensor can make efficient use of a larger fraction of the illumination light from the laser source, thereby enabling the development of an optically efficient displacement sensor.

Generally, the spatial frequency filter 112 includes a plane or area of a material substantially opaque to the scattered light surrounding an opening or aperture 124 to transmit at least a portion of the scattered light. The opening or aperture 124 may or may not include or be filled with another material substantially transparent to the scattered light. The purpose of the spatial frequency filter 112 is to transmit the desired or selected spatial frequencies while attenuating other, undesired spatial frequencies. For a speckle-based ONS 102 having a sensor-array 114 such as that shown in FIG. 1, selected spatial frequencies have normalized wavevectors of (1,1) and (1,−1). There is a one-to-one mapping between the normalized wavevector and a scaled image of the 2-D autocorrelation function, with normalized wavevector (0, 0) mapped to the center of the autocorrelation function, (1, 0) mapping to a point on the X axis of the autocorrelation function, and (0, 1) mapping to a point on the Y axis of the autocorrelation function. The scaling factor in this mapping depends upon the optical magnification, and can thus be adjusted by suitable design of the optical system of the ONS. For all spatial frequencies, the power transmitted to the sensor is proportional to the magnitude of the autocorrelation function at the point that is the mapped image of the corresponding spatial frequency. Thus, it is desirable that the selected spatial frequencies with normalized wavevectors (1, 1) and (1,−1) be mapped to points near the maximum of the 2-D autocorrelation function.

Some other spatial frequencies that may be present in the scattered light generally generate a zero response from the sensor-array 114 due the array design, i.e., light signals at spatial frequencies not matched to the period of the PDs in the array cancel out. Light signals at spatial frequencies of the form (n, 2k) and (2k, n), i.e., those that are an even harmonic of the spatial frequency corresponding to the period of the array, are cancelled out by the design of the array. However, it has been found that a few harmonics of the selected spatial frequency can produce a non-zero response in the sensor-array 114. The most significant of these undesired harmonics occur at spatial frequencies having normalized wavevectors of (1,−3), (−3, 1), and other similar wavevectors for the ONS described in this embodiment. However, it should be noted that other array patterns and wiring choices may select other spatial frequencies as the selected spatial frequency and may produce other undesirable spatial frequencies as well. Thus, the response of the ONS 102 to a given spatial frequency is proportional to the autocorrelation of the transmitting aperture, measured at the point that is the mapping of the given spatial frequency.

Conventional optical navigation sensors utilize a circular aperture extending through a solid or opaque plate of the spatial frequency filter. ONS with a circular aperture have not been wholly satisfactory for a number of reasons. In particular, the circular aperture has a diameter chosen to pass sufficient light to provide a minimally acceptable level of tracking on dark surfaces. However, use of a circular aperture can result in tracking distortion due to transmission of higher spatial frequency harmonics as well as a selected, central spatial frequency. In addition, tracking performance of ONSs utilizing circular apertures is sensitive to sensor height and angle alignments, particularly over dark surfaces.

The diameter of this circular aperture is chosen to allow sufficient optical signal collection to reach a minimally acceptable level of tracking when the ONS is moved across a dark surface. A conventional circular aperture has a circular autocorrelation function in which the area or region of greatest intensity of signal passing through the aperture is a circular region at the center of the aperture, surrounded by an annular ring of steadily decreasing signal intensity from the circular region to an edge of the aperture. It will always be the case that the autocorrelation takes on its maximum value at the center, which will dictate the transmission of the undesired (0, 0) spatial frequency, which is the DC component of the optical signal. This DC component is of little concern because it can be subtracted off in subsequent processing.

The selected signal corresponds to a spatial frequency having a normalized wavevector of (1, 1), which would be mapped to a point along a line running at 45 degrees with respect to the X axis, the distance along said line depending on the scaling factor, which, in turn, depends upon the diameter of the circular aperture and the magnification of the optical system. Note, however, that significant transmission occurs at all spatial frequencies that map to points within the boundaries of the autocorrelation function. As noted above, transmission of other, undesired spatial frequencies and harmonics can limit tracking performance and speed, particularly over dark surfaces, rendering the ONS sensitive to changes in sensor height and angle alignment relative to the surface. Since the designer can choose the relative scaling between normalized wavevector and aperture autocorrelation, it is possible to choose how far the selected and undesired spatial frequencies are from the origin of the autocorrelation function. The farther away any given spatial frequency is from the center of the autocorrelation function, the lower the transmission. If an undesirable spatial frequency falls outside the boundary of the autocorrelation function, then its transmission is zero and it makes no deleterious contribution to the ONS performance.

For the embodiment of the ONS in FIG. 1, for which the selected spatial frequencies have normalized wavevectors (1, 1) and (1,−1), the closest undesirable spatial frequencies that have nonzero response are the (1,−3), (1, +3), and similar spatial frequencies. The magnification of the optical system and aperture diameter are chosen so that these undesirable spatial frequency components fall outside the boundary of the 2-D autocorrelation function and therefore make no contribution to the detected signal. However, it is found that if the scaling factor is chosen so as to completely eliminate the (1,±3) spatial frequencies, then the desirable (1,±1) components map to points in the autocorrelation function far enough from the origin that their transmitted power is reduced to a level that sensor performance is degraded due to noise and other parasitic effects. Consequently, the aperture diameter is typically chosen so that some small amount of (1, ±3) component is transmitted so as to maximize the amount of (1, ±1) component that is transmitted. Therefore, an aperture design is chosen that minimizes the amount of (1, ±3) spatial frequency while preserving a desirable amount of (1, ±1) spatial frequency. With a conventional circular aperture, the rate at which transmitted power drops with increasing spatial frequency is fixed by the aperture, and so there is limited opportunity for optimizing the ratios of these two transmitted powers.

In contrast to the conventional circular apertures described above, the ONS 102 of the present disclosure includes a spatial frequency filter having a non-circular or non-convex aperture or pattern of apertures, which increases the signal level or transmission at the selected spatial frequency while minimizing the signal level or spatial frequency content at higher order harmonics of the fundamental spatial frequency. Thus, the apertures are chosen to have an autocorrelation that is as large as possible at a spatial frequency with a wavevector of (1, ±1), but is small or zero at wavevector of (1, ±3).

Spatial frequency filters and apertures or openings therein according to various embodiments will now be described in greater detail with reference to FIGS. 3 through 6.

Figure 3A:
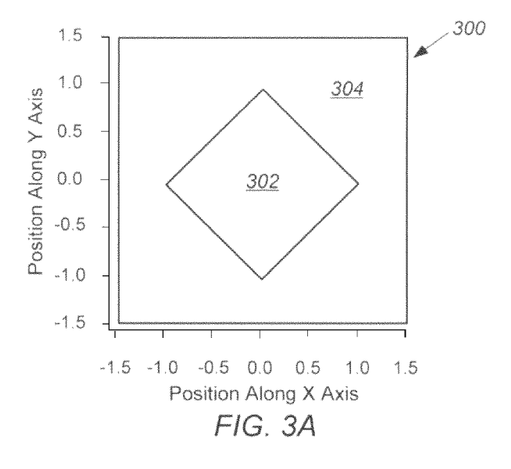
FIG. 3A is a planar view of an embodiment of a spatial frequency filter including a diamond-shaped aperture according to one embodiment.

In one embodiment, the spatial frequency filter 300 includes a diamond-shaped aperture 302 extending through a plate 304 of the spatial frequency filter, as shown in FIG. 3A. As noted above, the spatial frequency filter 300 includes a plane or area 304 of a material substantially opaque to at least some of the scattered light. As also noted above, the aperture 302 may include or be filled with another material substantially transparent to the scattered light. The spatial frequency filter 300 may be made, for example, of a plastic using a mold containing a square or diamond shaped feature to form the aperture 302. Alternatively, the spatial frequency filter 300 could be made using other manufacturing or machining techniques, such as laser cutting, to form the aperture 302.

Figure 3B:
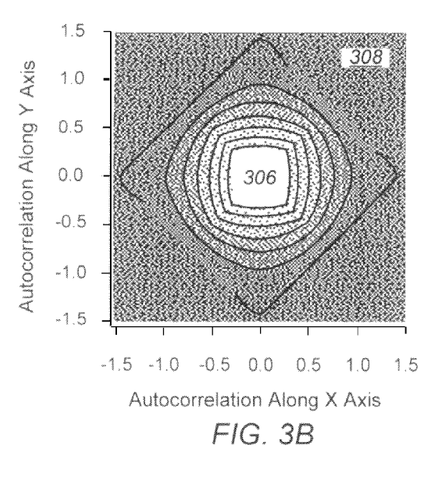
FIGS. 3B and 3C illustrate an autocorrelation function of the diamond-shaped aperture of FIG. 3A.
Figure 3C:
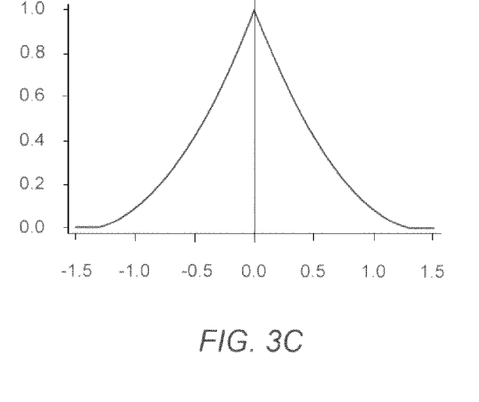

An autocorrelation function of the diamond-shaped aperture 302 is as illustrated in FIG. 3B. Note, in FIG. 3B intensity of the autocorrelation is shown by shading of the contour lines or regions, wherein the lighter shaded areas indicate greater intensity and the darker or more heavily shaded areas indicate lower intensity. Thus, in FIG. 3B the area or region of greatest intensity of signal passing through the aperture 302 is indicated by the un-shaded area 306 and the lowest intensity is indicated by the heavily shaded areas 308. A slice through this autocorrelation function, taken along the X axis, is shown in FIG. 3C. Referring to FIG. 3B it is observed that the autocorrelation has maxima extending along the wavevector in the (1,1) direction and other "corner" directions relative to the higher order harmonics, such as the wavevector in the (1,−3) direction. Thus, the aperture shape illustrated in FIG. 3A provides an enhanced response or transmission at the selected spatial frequencies relative to the transmission at the undesired spatial frequencies as compared to the circular aperture.

The precise dimensions of the diamond-shaped aperture 302 may be selected based on the pitch or period of PDs in the sensor-array, the size of the sensor-array and the location of the spatial frequency filter relative to the sensor-array. Exemplary embodiments of the diamond-shaped aperture 302 may include a diamond-shape having edges of from about 200 μm to about 500 μm. However, it will be understood that the size of the diamond-shaped aperture 302 may be scaled up or down depending on the desired total optical power, spatial period of the detector array, connection pattern of the detector array, and the optical system of the ONS.

Figure 4:
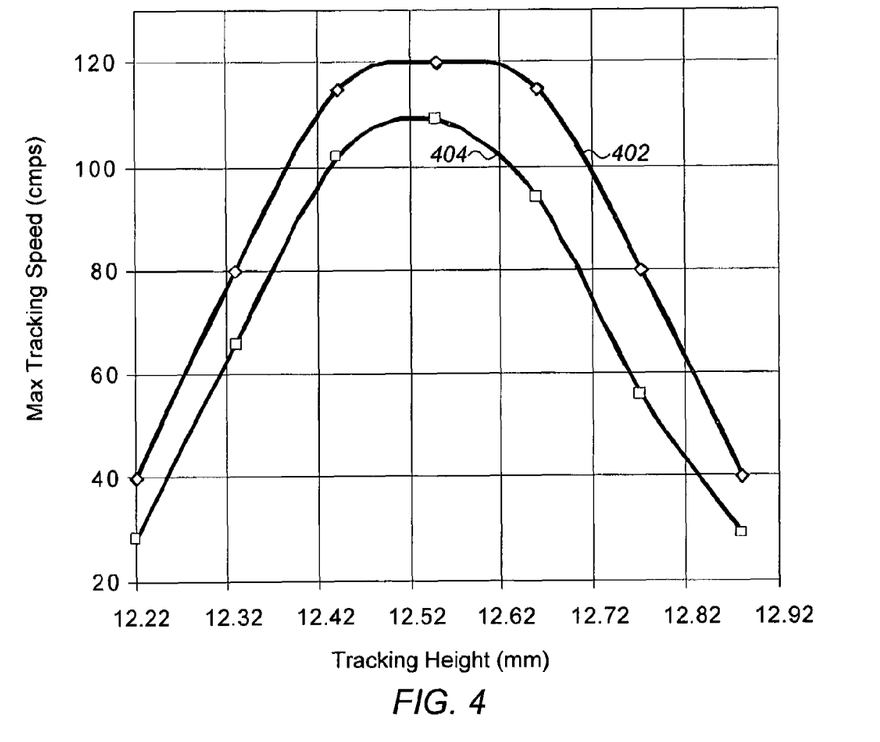
FIG. 4 is a graph illustrating tracking performance over a dark surface of an embodiment of an ONS having a spatial frequency filter including a non-circular aperture as compared to a conventional ONS.

Spatial frequency filters including non-circular or non-convex apertures enable the ONS to track surfaces at higher speeds, while maintaining good fine-motion performance. The tracking performance is illustrated in FIG. 4, which compares maximum permissible tracking speeds of an ONS with a conventional, round aperture having a diameter of about 320 μm with an embodiment including a diamond-shaped aperture having edges of about 326 μm as they track over a dark surface at heights ranging from 12.22 to 12.92 μm. Performance of an embodiment of the ONS with a diamond-shaped aperture is illustrated by the line labeled 402, while performance of the ONS with the round aperture is illustrated by the line labeled 404. Referring to FIG. 4 it is seen that the diamond-shaped aperture (line 402) uniformly provides higher tracking speeds than the circular aperture (line 404) across the range of heights. FIG. 4 shows the maximum tracking speed versus ONS-to-surface height over a surface with approximately a 3% scattering efficiency. For the exemplary ONS used to acquire data for this figure, the optimum height for signal collection is approximately 12.5 mm, and the maximum speed drops as the ONS is moved either closer or farther from the surface. Referring to FIG. 4 it is seen that performance of the ONS with the diamond shaped aperture (indicated by line 402) exhibits a higher maximum tracking speed and is less sensitive to the ONS-to-surface height over the surface.

In another embodiment, the spatial frequency filter can include multiple apertures, which may or may not include a non-circular or non-convex shape, arranged in a non-circular pattern. In the embodiment shown in FIG. 5, the spatial frequency filter 500 includes four circular apertures 502 arranged in a square or diamond-shaped pattern on a plane or area of substantially opaque material 504. The precise dimensions of the apertures 502 and the pattern may be selected based on the pitch or period of PDs in the sensor-array, the size of the sensor-array and the location of the spatial frequency filter relative to the sensor-array. In one exemplary embodiment, the spatial frequency filter 500 includes four, 80 μm circular apertures 502 arranged in a diamond-shaped pattern with 113 μm between adjacent apertures.

Figure 5:
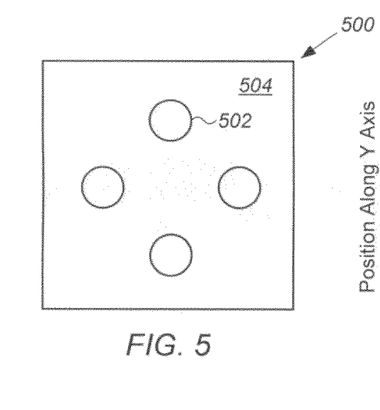
FIG. 5 is a planar view of an embodiment of a spatial frequency filter including multiple apertures arranged in a non-circular pattern.

The autocorrelation and enhanced performance of a multi-aperture spatial frequency filter similar to that of FIG. 5 will now be illustrated with reference to yet another embodiment shown in FIG. 6A. Referring to the spatial frequency filter 600 of FIG. 6A, it is seen that the circular apertures have been replaced with square apertures 602 in an opaque material 604 arranged in a pattern that has been rotated by 45° relative to the configurations shown in FIGS. 3A-C to enable easier computation of the autocorrelation functions, which are shown in FIGS. 7B to 7D.

Figures 6A, 6B:
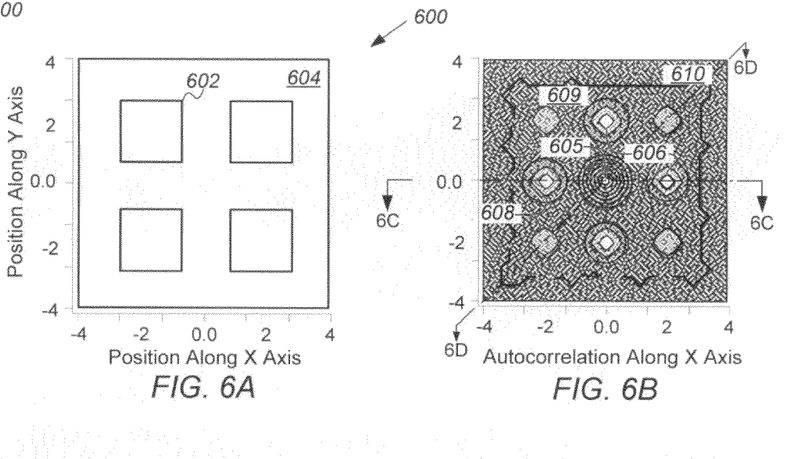
FIG. 6A is a planar view of an embodiment of a spatial frequency filter including multiple non-circular apertures.
FIGS. 6B through 6D illustrate the autocorrelation function of the spatial frequency filter of FIG. 6A rotated 45° to provide an autocorrelation function of a spatial frequency filter similar to that of FIG. 5.

FIG. 6B illustrates the autocorrelation function of a spatial frequency filter of FIG. 6A, which has again been rotated 45° relative to the configurations shown in FIGS. 3A-C to provide an autocorrelation for a spatial frequency filter similar to that from that of FIG. 6. Note that because of this 45° rotation the desirable (1, 1) and (1,−1) spatial frequency components map to points on the X and Y axis, respectively, of this autocorrelation function. Note, too, that as in the preceding autocorrelation FIG. 3B, the intensity of the autocorrelation is shown by shading of the areas or regions, wherein the lighter shaded areas indicate greater intensity. Thus, in FIG. 6B the regions of greatest intensity of signal passing through the apertures 602 is indicated by the un-shaded regions 605, the lowest intensity is indicated by the heavily shaded, regions 609, and the heavily shaded, dark area surrounding the shaded regions, labeled 610, represents the outside of the autocorrelation function for which there is substantially no signal transmission. Referring to FIG. 6B it is seen that the autocorrelation comprises nine (9) individual peaks, including a "main" peak 605 at spatial wavevector (0, 0), and four (4) secondary peaks 606 at (1, 1), (1,−1), (−1, 1), and (−1,−1), which, as noted above map to points on the X and Y axis of this 45°-rotated autocorrelation function. Note, the autocorrelation further includes four (4) tertiary peaks 608 at spatial wavevectors (2, 0), (−2, 0), (0, 2), and (0,−2), which, in the 45°-rotated autocorrelation function, are to be found along lines at 45° to the X and Y axes. Moreover, as shown in the autocorrelation of FIG. 6B and the following figures there are substantially no peaks at other spatial frequencies or harmonics, including the higher order harmonics of the fundamental or selected spatial frequency, i.e., at (1,−3), (−3,3), and (1,5).

Figure 6C:
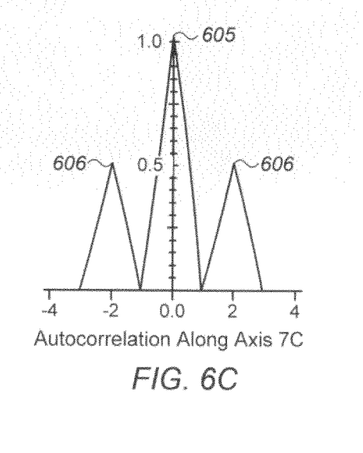
Figure 6D:
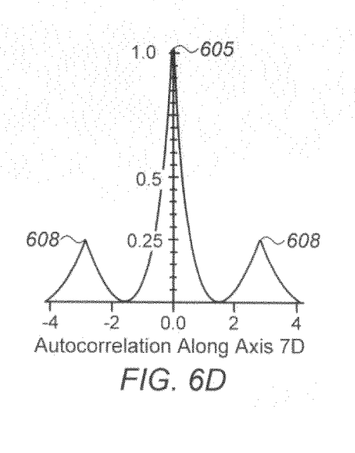

FIGS. 6C and 6D show a slice through this 2-D autocorrelation function, taken, respectively, at 0 degrees and 45 degrees with respect to the X axis, and where the transmission of the central or main peak 605 has been normalized to 1. Referring to FIG. 6C, which illustrates the relative transmission of peaks along a central, horizontal axis marked 6C in FIG. 6B, it is seen that the secondary peaks 606, which, due to the 45° rotation, are at desirable wavevectors (1, 1), and (1, −1), have a peak transmission of 50% or 0.5 relative to the main peak. It is further seen that the transmission is essentially zero at all other spatial frequencies with integral wavevector components.

FIG. 6D illustrates the relative transmission of the peaks along a central, 45° axis marked 6D in FIG. 6B, and includes the tertiary peaks 608 at wavevectors (2, 0), (−2, 0), (0, 2), and (0,−2). As shown, the relative transmission at these peaks is 25% or 0.25 of the main peak at (0, 0). However, because the sensor-array is designed (i.e., has a pitch or period of PDs) to have substantially no responsivity at these spatial frequencies the tertiary peaks may safely be ignored.

Thus, by suitable choice of multiple apertures and choice of multiple aperture shapes, it is possible to enhance some spatial frequencies' response while completely nulling out the response at other spatial frequencies.

For a specific example, it has been found that a conventional spatial frequency filter having a single, circular aperture with a diameter of 240 μm has a (1, 1) transmission of 0.555, and a 320 μm circular aperture has a (1, 1) transmission of 0.665, with a (1,−3) transmission of 0.265. In contrast, a spatial frequency filter having a non-convex aperture, such as a diamond-shape aperture having edges of about 337 μm, also has a (1,1) transmission of 0.665, but a (1,−3) transmission of only 0.219, or about 20% less than for the 320 μm circular aperture. Conversely, a 367 μm diamond-shape aperture also has a (1,−3) transmission of 0.265, but a (1, 1) transmission of 0.691, or about 4% more than the circular aperture.

In the preceding description, for purposes of explanation, numerous specific details have been set forth in order to provide a thorough understanding of the ONS and spatial frequency filter of the present disclosure. It will be evident; however, to one skilled in the art that the present ONS and spatial frequency filter may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the ONS or spatial frequency filter. The appearances of the phrase "one embodiment" in various places in the specification do not necessarily all refer to the same embodiment. The term "to couple" as used herein may include both to directly connect and to indirectly connect through one or more intervening components.

The foregoing description of specific embodiments and examples have been presented for the purpose of illustration and description, and although described and illustrated by certain of the preceding examples, the ONS and spatial frequency filter disclosed herein are not to be construed as being limited thereby. They are not intended to be exhaustive or to limit the ONS and spatial frequency filter to the precise forms disclosed, and many modifications, improvements and variations within the scope of the disclosure are possible in light of the above teaching.

What is claimed is:

1. An optical navigation sensor (ONS) comprising:
   a radiation source to transmit radiation toward a portion of a surface that diffusely reflects radiation incident thereon; and
   a spatial frequency filter disposed to receive radiation scattered from the surface, the spatial frequency filter including a plurality of non-circular openings configured to pass radiation of at least one pre-selected spatial frequency while attenuating other spatial frequencies and related harmonics of the pre-selected frequency, wherein the plurality of non-circular openings comprise a polygon shape and are located relative to one another to define a square or diamond-shaped pattern on a surface of the spatial frequency filter, and wherein the ONS is a speckle-based ONS adapted to track motion of the ONS relative to the surface based on an interference pattern created by radiation scattered from the surface and the number of non-circular openings of the spatial frequency filter.

2. An ONS according to claim 1, wherein the plurality of non-circular openings comprise at least one opening having a convex polygon shape.

3. An ONS according to claim 1, wherein the plurality of non-circular openings comprise at least one opening having a square, rectangular, triangular or diamond shape.

4. An ONS according to claim 1, wherein the plurality of openings comprise at least one opening having a square, rectangular, triangular or diamond shape.

5. An ONS according to claim 1, further comprising an imaging lens, and wherein the spatial frequency filter is located relative to the imaging lens to provide telecentric imaging to preserve integrity of the complex interference pattern during motion.

6. An ONS according to claim 1, further comprising an imaging lens, and wherein the spatial frequency filter is located at a Fourier transform plane of the imaging lens.

7. An optical navigation sensor (ONS) comprising:
a radiation source to transmit radiation toward a portion of a surface that diffusely reflects radiation incident thereon; and
a spatial frequency filter disposed to receive radiation scattered from the surface, the spatial frequency filter including a plurality of non-circular openings configured to pass radiation of at least one pre-selected spatial frequency while attenuating other spatial frequencies and related harmonics of the pre-selected frequency, wherein the plurality of non-circular openings comprise a polygon shape and are located relative to one another to define a square or diamond-shaped pattern on a surface of the spatial frequency filter, and wherein the plurality of non-circular openings comprise at least one opening having a non-convex polygon shape.

8. A spatial frequency filter for use with an optical navigation sensor (ONS), the spatial frequency filter is disposed in the ONS to receive radiation from a radiation source scattered from a surface, the spatial frequency filter comprising a plurality of non-circular openings configured to pass radiation of at least one pre-selected spatial frequency while attenuating other spatial frequencies and related harmonics of the pre-selected frequency, wherein the plurality of non-circular openings comprise a polygon shape and are located relative to one another to define a square or diamond-shaped pattern on a surface of the spatial frequency filter,
wherein the plurality of noncircular openings comprise at least one opening having a non-convex polygon shape.

9. A spatial frequency filter according to claim 8, wherein the plurality of non-circular openings comprise at least one opening having a convex polygon shape.

10. A spatial frequency filter according to claim 8, wherein the plurality of non-circular openings comprise at least one opening having a square, rectangular, triangular or diamond shape.

11. A spatial frequency filter according to claim 8, wherein the plurality of openings comprise at least one opening having a square, rectangular, triangular or diamond shape.

12. A spatial frequency filter according to claim 8, wherein the plurality of non-circular openings comprise a substantially equal area.

13. A spatial frequency filter according to claim 12, wherein each of the plurality of non-circular openings comprise a square shape.

* * * * *